United States Patent
Legois

(10) Patent No.: US 12,319,029 B2
(45) Date of Patent: Jun. 3, 2025

(54) LAMINATED GLAZING COMPRISING A TRANSPARENT SUBSTRATE WITH A HEATING LAYER HAVING FLOW LINES WHICH ALTOGETHER ARE OF VARIABLE WIDTH

(71) Applicant: SAINT-GOBAIN GLASS FRANCE, Courbevoie (FR)

(72) Inventor: Vincent Legois, Germigny des Pres (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 595 days.

(21) Appl. No.: 17/299,585

(22) PCT Filed: Dec. 4, 2019

(86) PCT No.: PCT/FR2019/052931
§ 371 (c)(1),
(2) Date: Jun. 3, 2021

(87) PCT Pub. No.: WO2020/120879
PCT Pub. Date: Jun. 18, 2020

(65) Prior Publication Data
US 2023/0146513 A1   May 11, 2023

(30) Foreign Application Priority Data
Dec. 11, 2018 (FR) ...................... 1872679

(51) Int. Cl.
*B32B 17/10* (2006.01)
*B32B 7/12* (2006.01)

(52) U.S. Cl.
CPC .......... *B32B 17/10036* (2013.01); *B32B 7/12* (2013.01); *B32B 17/10211* (2013.01);
(Continued)

(58) Field of Classification Search
CPC ................ B32B 7/12; B32B 17/10036; B32B 17/10119; B32B 17/10174;
(Continued)

(56) References Cited

U.S. PATENT DOCUMENTS

2004/0065651 A1 * 4/2004 Voeltzel ............ B32B 17/10293
219/203
2005/0178756 A1 8/2005 Degand et al.
(Continued)

FOREIGN PATENT DOCUMENTS

EP           1 897 412 B1    12/2013
WO   WO-2007039747 A1 *  4/2007   ............. B32B 15/08
WO   WO-2017001792 A1 *  1/2017   ....... B32B 17/10174

OTHER PUBLICATIONS

"Influence of laser spot size and shape on ablation efficiency using ultrashort pulse laser system", 10th CIRP Conference on Photonic Technologies, Chaja et al, Procedia CIRP 74, pp. 300-304, 2018 (Chaja) (Year: 2018).*

(Continued)

*Primary Examiner* — Humera N. Sheikh
*Assistant Examiner* — Kevin Ct Li
(74) *Attorney, Agent, or Firm* — Pillsbury Winthrop Shaw Pittman LLP

(57) ABSTRACT

A laminated glazing is formed of several rigid transparent substrates adhesively bonded in pairs by an interlayer adhesive layer, at least one of these transparent substrates being coated with an electrically conductive layer, a zone of this transparent substrate exhibiting four opposite edges in pairs, a first and a second busbar being positioned along two opposite edges, the electrically conductive layer exhibiting flow lines for guiding the electric current between the busbars, the set of flow lines being of variable width.

22 Claims, 2 Drawing Sheets

(52) U.S. Cl.
CPC .... B32B 17/1077 (2013.01); B32B 17/10788 (2013.01); *B32B 2255/20* (2013.01); *B32B 2307/202* (2013.01); *B32B 2307/412* (2013.01); *B32B 2311/04* (2013.01); *B32B 2311/08* (2013.01); *B32B 2311/16* (2013.01); *B32B 2605/00* (2013.01)

(58) Field of Classification Search
CPC ......... B32B 17/10192; B32B 17/10211; B32B 17/10761; B32B 17/1077; B32B 17/10788; B32B 2255/20; B32B 2307/202; B32B 2307/412; B32B 2311/04; B32B 2311/08; B32B 2311/16; B32B 2605/00; H05B 3/84; H05B 2203/005; H05B 2203/013
See application file for complete search history.

(56) References Cited

U.S. PATENT DOCUMENTS

| 2005/0265408 | A1* | 12/2005 | Lei ...................... H05K 3/0032 |
| | | | 372/30 |
| 2008/0035629 | A1* | 2/2008 | Thiry ................ B32B 17/10761 |
| | | | 219/203 |
| 2008/0296272 | A1* | 12/2008 | Lei ...................... H05K 3/0038 |
| | | | 219/121.68 |
| 2015/0351160 | A1* | 12/2015 | Phan ................ B32B 17/10761 |
| | | | 219/203 |

OTHER PUBLICATIONS

International Search Report as issued in International Patent Application No. PCT/FR2019/052931, dated May 19, 2020.

* cited by examiner

[Fig. 1]
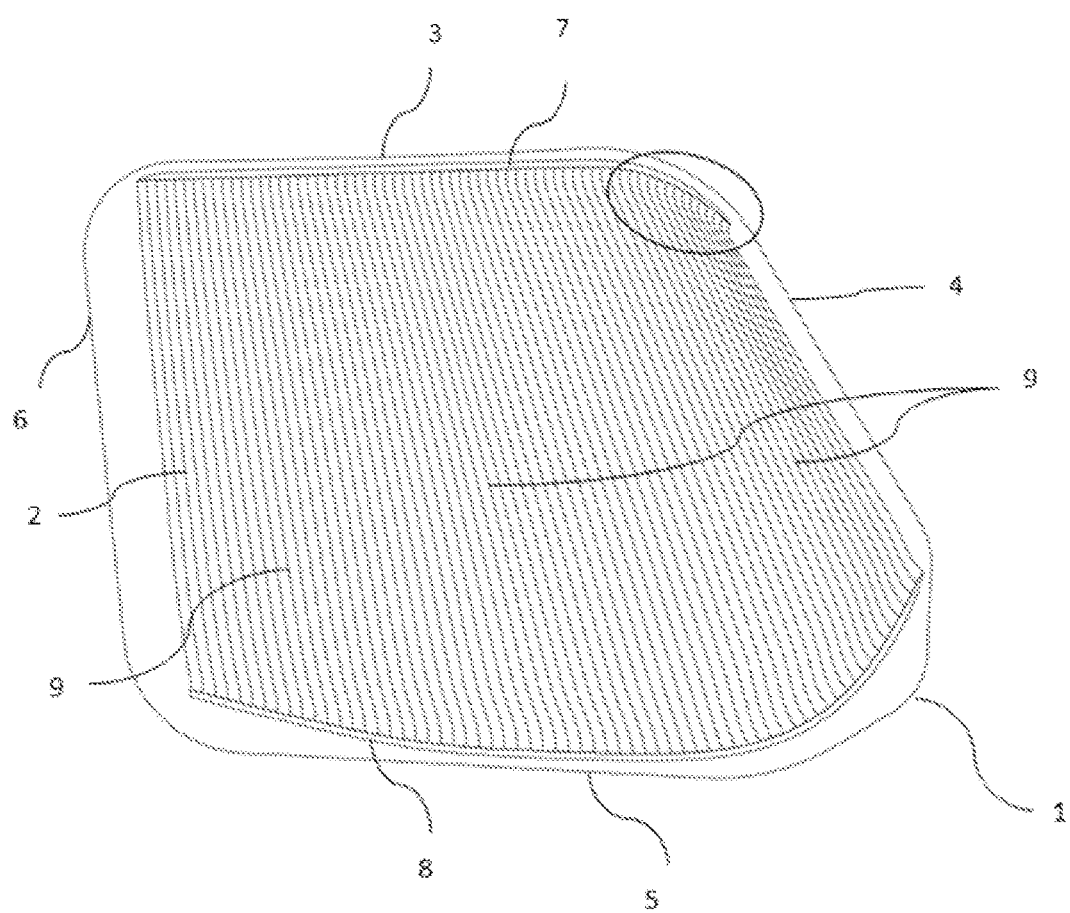

[Fig. 2]
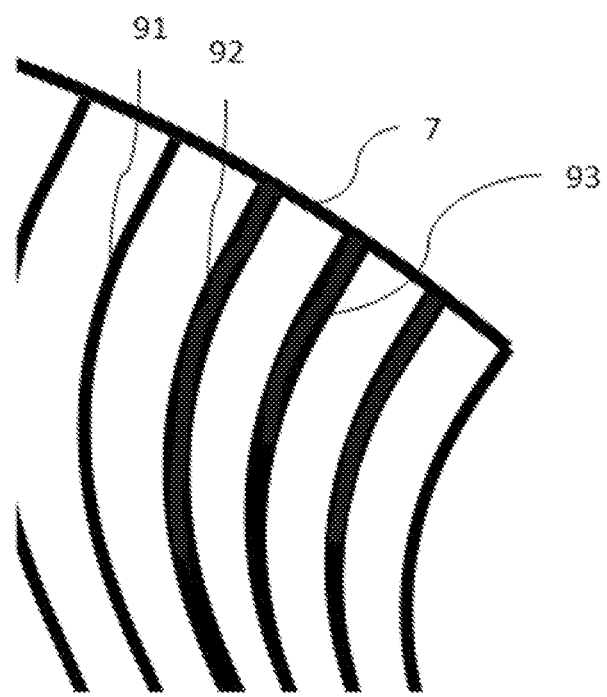

LAMINATED GLAZING COMPRISING A TRANSPARENT SUBSTRATE WITH A HEATING LAYER HAVING FLOW LINES WHICH ALTOGETHER ARE OF VARIABLE WIDTH

CROSS-REFERENCE TO RELATED APPLICATIONS

This application is the U.S. National Stage of PCT/FR2019/052931, filed Dec. 4, 2019, which in turn claims priority to French patent application number 1872679 filed Dec. 11, 2018. The content of these applications are incorporated herein by reference in their entireties.

Glazings for transportation vehicles (airplanes, trains, helicopters, boats, cars, and the like) and, in some cases, glazings for buildings can be equipped with heating functions incorporated in the glazings in order to prevent/eliminate, as the case may be, the formation of fogging on the interior face or frost on the exterior face.

The heating is characterized by its specific power ($W/m^2$), which is suited to the specific need of each application.

The heating system is formed, for example, of wires screen-printed on the monolithic glazing or embedded in an interlayer adhesive layer of the laminated glazing, or of transparent conductive layers (doped oxides: indium oxide doped with tin -"Indium Tin Oxide": ITO-, AZO (Aluminum Zinc Oxide), $SnO_2$: F, or metals, such as silver, or optionally in identical or different multilayers), making possible heating by the Joule effect. In both these cases, the heating system is supplied via electrodes at a voltage available in the vehicle or the building.

Glasses with a heating layer are obtained either by cutting out and optionally shaping a glass already exhibiting a layer or by deposition of the layer a posteriori (after cutting out) on a shaped glass. The term "glass" is understood here preferably to mean any inorganic glass, but also a rigid transparent substrate made of polymer material, a typical example of which is poly(methyl methacrylate) (PMMA).

Since it is not possible to uniformly heat a non-rectangular shape using a layer of uniform electrical conductivity, two strategies are implemented:
  electrical conductivity gradient typically obtained by a thickness gradient of the electrically conductive layer, such as conductive metal oxide (typically ITO); high variations in layer thickness make it possible to limit the current density in certain pats of the heating surface; the more complex the shape, the more marked the thickness gradient and the more difficult to produce from an industrial viewpoint;
  ablation lines in an electrically conductive layer, called flow separation lines or more commonly flow lines, as described in the patent EP 1 897412-131, which guide the flow of electric current; this solution gives good results in terms of uniformity only if the current leads are parallel and of identical lengths (small deviations tolerated).

These two strategies can be employed in combination.

The means put in place to deposit the thickness gradient of electrically conductive layer can be difficult to control and the overall electrical resistance of the layer, over the entire surface of the glazing, can vary significantly. Over the whole of the glazing, at a constant electric current voltage U between the leads (busbars), the nominal total power for an overall resistance R of the electrically conductive layer is equal to $U^2/R$; if this overall resistance R is too low, this can be reflected by an excessively high power (too much power consumed by the heating system) and, in the extreme case, the product will have to be discarded, the product no longer being within the required tolerances.

In addition, when the heated glazing is complex in shape and when flow lines are produced on the electrically conductive layer so as to guide the electric current and to a certain extent to render the the local heating power density uniform, nonuniformities in this power density over the whole of the surface of the glazing can nevertheless remain; in particular, in acute angles of the surface of the glazing, the heating power density is lower, insufficiently high. Locally, between two flow lines, at a constant electric current intensity i throughout the conductive strip, the power P dissipated locally is equal to $R.i^2$ and the power density Ps is equal to P/S, in $watt/dm^2$, for example, S being the surface area between two flow lines.

The invention thus endeavors to design a heated glazing, the nominal power of which does not exceed a certain maximum value, and the power densities of which are rendered uniform to a controlled extent over the entire surface area of the glazing, and in particular the minimum powers densities of which, in certain corner zones, for example, are increased.

This aim has been achieved by the invention which, consequently, has as subject matter a laminated glazing formed of several rigid transparent substrates adhesively bonded to one another in pairs via an interlayer adhesive layer, at least one of these transparent substrates being coated with an electrically conductive layer, a zone of this transparent substrate exhibiting four opposite edges in pairs, a first and a second busbar being positioned along two opposite edges, the electrically conductive layer exhibiting flow lines for guiding the electric current between the busbars, characterized in that the set of the flow lines is of variable width.

The production of flow lines having variable width makes it possible to better control the ohm is resistance of the layer and to adjust as best as possible the power consumed by the layer.

The use of a laser with a scanner, for example, makes it possible to vary the width of the flow lines obtained by ablation.

By measuring the ohmic resistance of the heating layer, when it is less than the nominal value, it becomes possible to adjust as best as possible the width of the flow lines in order to obtain a conformable resistance close to the nominal value.

In the zones of the glazing where the power density is too low, the widening of the flow lines correspondingly decreases the width of the electrically conductive strips, having the consequence both of increasing their resistance R and decreasing their surface area S, twofold source of increase in the power density $R \cdot i^2/S$ locally. The invention makes it possible to substantially reduce cold points, even in the absence of a thickness gradient of the heating layer.

Several electrically conductive layers can coexist at different thickness levels of the laminated glazing.

According to specific embodiments:
  the electrically conductive layer is based on doped metal oxide, such as indium oxide doped with tin (ITO) and/or tin oxide doped with fluorine $SnO_2$:F and/or zinc oxide doped with aluminum (AZO), and/or on a metal, such as gold Au and/or silver Ag, optionally in the form of a multilayer stack, in particular of the type comprising at least one silver layer;
  the electrically conductive layer has a thickness of between 2 and 1600 nm;

- the electrically conductive layer exhibits a thickness gradient, that is to say a variation in its thickness, which is not constant;
- the flow lines have a width of between 5 and 1000 µm;
- the distance between two neighboring flow lines is at least equal to 8, at most to 40, and in increasing order of preference to 30, 25 and 20 mm;
- the electrically conductive layer exhibits phase separation lines consisting of ablation lines with a width of between 500 and 2000 µm; these phase separation lines delimit three zones of different phases in the use of three-phase current;
- said rigid transparent substrates are made of glass, such as soda-lime, alum inosilicate or borosilicate glass, if appropriate chemically reinforced, heat tempered or semi-tempered, or of polymer material, such as poly(methyl methacrylate) (PMMA), polycarbonate (PC), poly(ethylene terephthalate) (PET) or polyurethane (PU);
- the electrically conductive layer is on the face oriented toward the inside of the laminated glazing of at least one of the two rigid transparent substrates constituting the two exterior surfaces of the laminated glazing;
- the interlayer adhesive layer is chosen from polyvinyl butyral (PVB), polyurethane (PU), poly(ethylene/vinyl acetate) (EVA), ionomer, alone or as a mixture of several of them;
- one flow line (92; 93) at least has a locally increased width, in order to locally increase the electrical resistance, locally decrease the surface area of the conductive zone and locally increase the heating power density, so as to eliminate a cold point; this is the case in particular in a corner zone of complex shape deviating from a right angle, in which the heating power density is insufficient.

Another subject matter of the invention is a process for the manufacture of a laminated glazing described above, comprising the formation, on an electrically conductive layer, of flow lines of controlled variable width by ablation by means of a pulsed laser combined with a scanner in order to move the laser spot, and/or by localized chemical stripping of the electrically conductive layer and/or by deposition of a first coating, such as an ink, according to a pattern corresponding to the flow lines, deposition as second coating of the electrically conductive layer, then elimination, such as dissolution, of said first coating and of the fraction of the electrically conductive layer covering it. The latter process is known under the term "lift-off".

Another subject matter of the invention consists of the application of a laminated glazing described above as heated glazing for an aerial, ground, in particular rail, or water, in particular marine, vehicle which is armored.

According to a first form of this application, the faces of said rigid transparent substrates are numbered starting from that in contact with the external atmosphere, defined as face 1, and the electrically conductive layer coats a face n of the laminated glazing, with n greater than or equal to and preferably equal to 2, for an application as deicing/anti-icing glazing.

According to a second form of this application, the faces of the rigid transparent substrates being numbered as has just been defined, the electrically conductive layer coats a face n of the laminated glazing, with n greater than or equal to 3, preferably the face oriented toward the inside of the laminated glazing of the rigid transparent substrate in contact with the interior volume of the vehicle, for an application as demisting/antimisting glazing.

THE APPENDED DRAWINGS ILLUSTRATE THE INVENTION

FIG. 1 represents a rigid transparent substrate coated with an anti-icing heating layer, and intended to form part of an aircraft cockpit laminated glazing of complex shape; front view.

FIG. 2 is a partial diagrammatic front view of an anti-icing heating layer such as that of FIG. 1 comprising flow lines in accordance with the invention.

With reference to FIG. 1, a transparent substrate made of alum inosilicate glass is coated with an electrically conductive layer 2 made of indium oxide doped with tin (ITO) with a substantially uniform thickness, a zone 1 of which exhibits four opposite edges in pairs (3, 5), (4, 6), a first and a second busbar 7, 8 being positioned along two opposite edges 3, 5.

Ablation lines of the electrically conductive layer 2 constitute flow lines 9 to guide the electric current between the busbars 7, 8.

If these flow lines 9 are of constant width, the rounded corner zone in FIG. 1 is a zone with a lower heating power density than that of the central zones of the anti-icing heating layer 2. In this corner zone, the power density is insufficient.

In order to remedy this, the flow lines 9 are of variable width according to the invention, as represented in FIG. 2. For example, the flow line 91 is of constant width 200 µm, the flow line 92 is of constant width 600 µm and the flow line 93 has a width varying from 200 to 600 µm. By thus widening the flow lines 92, 93, the electrical resistance is locally increased, the surface area of the conductive zone is reduced and the heating power density is locally increased, so as to eliminate the cold point, even in the absence of a thickness gradient of the heating layer 2.

The following tables 1, 2 and 3 give examples of gain in resistance between leads (busbars) (total resistance) Ra of an electrically conductive layer made of ITO with a thickness of 200 nm, provided with 60 equidistant flow lines, between leads 100 mm apart, as a function of the width of the heating layer and of the width of the flow lines.

TABLE 1

| Layer resistivity | $2.10^{-6}$ | ohm · m |
|---|---|---|
| Layer width | 1000 | mm |
| Distance between leads | 100 | mm |
| Width of lines | 100 | µm |
| Number of lines | 60 | |
| Layer thickness | 200 | nm |
| Ra without lines | 1 | ohm |
| Ra with lines | 1.01 | ohm |
| Delta R | 0.60 | % |

TABLE 2

| Layer resistivity | $2.10^{-6}$ | ohm · m |
|---|---|---|
| Layer width | 1000 | mm |
| Distance between leads | 100 | mm |
| Width of lines | 600 | µm |
| Number of lines | 60 | |
| Layer thickness | 200 | nm |
| Ra without lines | 1 | ohm |
| Ra with lines | 1.04 | ohm |
| Delta R | 3.73 | % |

TABLE 3

| Layer resistivity | $2.10^{-6}$ | ohm · m |
|---|---|---|
| Layer width | 800 | mm |
| Distance between leads | 100 | mm |
| Width of lines | 600 | µm |

TABLE 3-continued

| | | |
|---|---|---|
| Number of lines | 60 | |
| Layer thickness | 200 | nm |
| Ra without lines | 1.25 | ohm |
| Ra with lines | 1.31 | ohm |
| Delta R | 4.71 | % |

On comparing table 1 and table 2, for a heating layer width of 1000 mm, widening the flow lines from 100 to 600 μm increases the resistance between leads Ra by 3.73% instead of 0.60%, compared with an absence of flow lines.

In table 3, it is seen that, for an electrically conductive layer width of 800 mm, flow lines with a width of 600 μm cause the resistance to increase by 4.71%, still compared with an absence of flow lines.

The invention claimed is:

1. A laminated glazing comprising several rigid transparent substrates adhesively bonded to one another in pairs via an interlayer adhesive layer, at least one transparent substrate of the several rigid transparent substrates being coated with an electrically conductive layer, a zone of the transparent substrate exhibiting four opposite edges in pairs, a first and a second busbar being positioned along two opposite edges, the electrically conductive layer exhibiting a set of flow lines for guiding an electric current between the first and second busbars, wherein the set of the flow lines for guiding the electric current between the first and second busbars consists of ablation lines formed within a thickness of the electrically conductive layer that is coated on the at least one transparent substrate, said ablation lines being of variable width, and wherein at least one of the ablation lines has a width that varies along a length of said at least one of the ablation lines.

2. The laminated glazing as claimed in claim 1, wherein the electrically conductive layer is based on doped metal oxide and/or on a metal, optionally in the form of a multilayer stack.

3. The laminated glazing as claimed in claim 1, wherein the electrically conductive layer has a thickness of between 2 and 1600 nm.

4. The laminated glazing as claimed in claim 1, wherein the electrically conductive layer exhibits a thickness gradient.

5. The laminated glazing as claimed in claim 1, wherein the flow lines have a width of between 5 and 1000 μm.

6. The laminated glazing as claimed in claim 1, wherein a distance between two neighboring flow lines is at least equal to 8 and at most to 40 mm.

7. The laminated glazing as claimed in claim 1, wherein the electrically conductive layer exhibits phase separation lines consisting of ablation lines with a width of between 500 and 2000 μm.

8. The laminated glazing as claimed in claim 1, wherein said rigid transparent substrates are made of glass, which is optionally chemically reinforced, heat tempered or semi-tempered, or of polymer material.

9. The laminated glazing as claimed in claim 1, wherein the electrically conductive layer is on a face oriented toward an inside of the laminated glazing of at least one of two rigid transparent substrates constituting two exterior surfaces of the laminated glazing.

10. The laminated glazing as claimed in claim 1, wherein the interlayer adhesive layer is chosen from polyvinyl butyral (PVB), polyurethane (PU), poly(ethylene/vinyl acetate) (EVA), ionomer, alone or as a mixture of several of them.

11. The laminated glazing as claimed in claim 1, wherein one flow line at least has a locally increased width, in order to locally increase an electrical resistance, locally decrease a surface area of the conductive zone and locally increase a heating power density, so as to eliminate a cold point.

12. A process for the manufacture of a laminated glazing as claimed in claim 1, comprising forming, on an electrically conductive layer, flow lines of controlled variable width by ablation by a pulsed laser combined with a scanner in order to move a laser spot, by localized chemical stripping of the electrically conductive layer and/or by deposition of a first coating according to a pattern corresponding to the flow lines, depositing a second coating of the electrically conductive layer, then eliminating said first coating and a fraction of the electrically conductive layer covering it.

13. A method comprising manufacturing a heated glazing for an aerial, ground or water vehicle which is armored with the laminated glazing as claimed in claim 1.

14. The method as claimed in claim 13, in which the faces of said rigid transparent substrates are numbered starting from that in contact with an external atmosphere, defined as face 1, and the electrically conductive layer coats a face n of the laminated glazing, with n greater than or equal to 2, for an application as deicing/anti-icing glazing.

15. The method as claimed in claim 13, in which the faces of said rigid transparent substrates are numbered starting from that in contact with the external atmosphere, defined as face 1, and the electrically conductive layer coats a face n of the laminated glazing, with n greater than or equal to 3.

16. The laminated glazing as claimed in claim 2, wherein the doped metal oxide is indium oxide doped with tin (ITO) and/or tin oxide doped with fluorine $SnO_2$:F and/or zinc oxide doped with aluminum (AZO), and the metal is gold Au and/or silver Ag.

17. The laminated glazing as claimed in claim 1, wherein the multilayer stack comprises at least one silver layer.

18. The laminated glazing as claimed in claim 6, wherein the distance between two neighboring flow lines is 20 mm.

19. The laminated glazing as claimed in claim 8, wherein said glass is a soda-lime, aluminosilicate or borosilicate glass, and the polymer material is poly(methyl methacrylate) (PMMA), polycarbonate (PC), poly(ethylene terephthalate) (PET) or polyurethane (PU).

20. The method as claimed in claim 15, wherein the electrically conductive layer coats the face oriented toward the inside of the laminated glazing of the rigid transparent substrate in contact with the interior volume of the vehicle, as demisting/antimisting glazing.

21. The laminated glazing as claimed in claim 1, wherein said at least one of the ablation lines that has the width that varies along the length of said at least one of the ablation lines is in contact with the first and second busbars.

22. The laminated glazing as claimed in claim 1, wherein the width of said at least one of the ablation lines that has the width that varies along the length of said at least one of the ablation lines increases in a corner zone of the laminated glazing.

* * * * *